US007342371B2

(12) United States Patent
Zuzuly et al.

(10) Patent No.: US 7,342,371 B2
(45) Date of Patent: Mar. 11, 2008

(54) SYSTEM AND METHOD FOR DETECTING MOTOR RUN CONDITION

(75) Inventors: Daniel Zuzuly, Geneva, IL (US); Scott Mayhew, North Aurora, IL (US)

(73) Assignee: Siemens Energy & Automation, Inc., Alpharetta, GA (US)

(*) Notice: Subject to any disclaimer, the term of this patent is extended or adjusted under 35 U.S.C. 154(b) by 629 days.

(21) Appl. No.: 10/833,828

(22) Filed: Apr. 28, 2004

(65) Prior Publication Data

US 2005/0241883 A1 Nov. 3, 2005

(51) Int. Cl.
*H02H 7/08* (2006.01)

(52) U.S. Cl. ...................... 318/434; 318/432; 318/433; 318/778; 318/782; 318/799; 187/247; 361/23; 361/33

(58) Field of Classification Search ..................... None
See application file for complete search history.

(56) References Cited

U.S. PATENT DOCUMENTS 4,434,390 A * 2/1984 Elms .......................... 318/473
4,467,260 A * 8/1984 Mallick et al. ............. 318/800
4,476,423 A * 10/1984 Mallick et al. ............. 318/800
4,743,816 A * 5/1988 Prather ....................... 318/455
4,787,481 A * 11/1988 Farrar et al. ................ 187/247
5,341,080 A * 8/1994 Agut Sanz .................. 318/778
5,374,794 A * 12/1994 Holmes ...................... 187/275
5,522,479 A * 6/1996 Jo .............................. 187/275
5,825,143 A * 10/1998 Montgomery ............... 318/381
5,925,998 A * 7/1999 Olson ......................... 318/484
6,038,114 A * 3/2000 Johnson ....................... 361/23
6,066,931 A * 5/2000 Morris et al. ............... 318/445
6,160,365 A * 12/2000 Younger et al. .............. 318/16
6,167,965 B1 * 1/2001 Bearden et al. ........ 166/250.15
6,294,888 B1 * 9/2001 Becker ........................ 318/471
6,924,613 B2 * 8/2005 Jonsson et al. ............. 318/432
6,984,950 B2 * 1/2006 Jonsson et al. ............. 318/440
7,006,338 B2 * 2/2006 Mayhew et al. .............. 361/23
7,130,170 B2 * 10/2006 Wakefield et al. ............ 361/23
2004/0155622 A1 * 8/2004 Mayhew et al. ............ 318/778
2005/0185350 A1 * 8/2005 Wakefield et al. ............ 361/23
2005/0200326 A1 * 9/2005 Mayhew et al. ............ 318/600

* cited by examiner

*Primary Examiner*—Lincoln Donovan
*Assistant Examiner*—Eduardo Colon

(57) ABSTRACT

A motor control system for detecting motor run condition comprises power switches for connection to an AC line for controlling application of AC power to the motor. An input receives a motor start command. A controller is connected to the input and controls operation of the switches responsive to a motor start command. The controller includes a counter and a timer and is operable to disable the power switches if number of starts during a select interval exceeds a first threshold and to disable the power switches if motor run time after a motor start command exceeds a second threshold.

26 Claims, 4 Drawing Sheets

SYSTEM AND METHOD FOR DETECTING MOTOR RUN CONDITION

FIELD OF THE INVENTION

This invention relates to a motor controller and, more particularly, to a system and method for detecting motor run condition.

BACKGROUND OF THE INVENTION

Solid state starters/controllers have found widespread use for controlling application of power to an AC induction motor. The conventional starter/controller, referred to hereinafter as simply a starter or a controller, uses solid state switches for controlling application of AC line voltage to the motor. The switches may be thyristors such as silicon controlled rectifiers (SCRs) or triacs.

One application for a motor controller is as an elevator starter. The elevator starter may be used to drive a pump motor for an hydraulic elevator. Each time movement of an elevator car is commanded, the starter must start the motor until it reaches operating speed and then operate in a run mode. Such a starter may only be used for the up direction as gravity may be used for the down direction. One type of elevator starter, referred to as a soft starter, changes the on time of the solid state switches to control voltage and to ramp up motor current with a fixed connection.

A motor may be rated for a limited number of starts in a select time interval. A typical maximum number of starts for an hydraulic elevator system is eighty starts per hour. This averages one start every forty-five seconds. The motor may be periodically started to briefly level the car as needed. If leaks or other problems are present, the motor may start several times at each landing to keep the car level at the floor. Furthermore, many systems use mechanical relays in the circuit controlling the motor starter. Problems associated with relays, such as dirty or worn contacts, can cause an intermittent output instead of a continuous output from the relay. Often the problems may exist for long period of time before being detected. The problems themselves can be intermittent and are difficult to diagnose with out witnessing the condition.

Known soft starters may include fault indication. However, in the situation described above, an overload fault is not a clear indicator of what is causing the fault. In addition, a common industry standard is to set the overload at 140% of the applied motor's rated current as under a fully loaded condition the currents can reach these levels. Depending on times between starts, at this setting, the motor may be damaged before the overload trips out.

The motors in hydraulic elevator systems are usually not rated for continuous duty cycle and can be damaged if allowed to run for long periods of time. Hydraulic elevators are typically not used on rises greater than seventy feet. A slow freight car would be able to travel this distance in less than two minutes.

On hydraulic elevator systems, it is important to keep the temperature within a normal operating range for predictable floor leveling. If the temperature of the oil is out of this range, the car may not stop in the desired position. One method is to simply run the pump and motor to recirculate oil from the tank, through the valve and back into the tank. When the oil is recirculating, the currents typically are below the rated current of the motor.

Both mechanical and solid state motor starters typically have overload protection either built into the starter, or as supplemental devices. The tripping time of the overload is a function of the current. This typically is either an (I t) or an ($I^2$ t) function. To those knowledgeable in the function of overload relays it is obvious that the currents must exceed the full load amp setting by some amount (typically 10 to 20%) for an extended time period to cause the overload relay function to trip. If the motor is allowed to continue to run due to a welded contact in the control circuit or a problem in the oil heating circuit, the motor may run until it fails. Often the oil will heat to a temperature which could cause damage to the valve. In extreme cases the motor may catch fire or the oil may give off quantities of smoke. Because the currents are below the overload setting, the overload will not trip.

The present invention is directed to solving one or more of the problems discussed above, in a novel and simple manner.

SUMMARY OF THE INVENTION

In accordance with the invention there is provided a system and method for detecting motor run condition.

In accordance with one aspect of the invention there is disclosed a motor control system for detecting motor run condition comprising power switches for connection to an AC line for controlling application of AC power to the motor. An input receives a motor start command. A controller is connected to the input and controls operation of the switches responsive to a motor start command. The controller includes a counter and a timer and is operable to disable the power switches if number of starts during a select interval exceeds a first start threshold and to disable the power switches if motor run time after a motor start command exceeds a first run threshold.

It is a feature of the invention that the controller comprises a programmed processor.

It is another feature of the invention that the input comprises a communication interface for receiving the motor start command from an external device.

It is yet another feature of the invention that the controller is operable to issue a first warning command if number of starts during the select interval exceeds a second start threshold lower than the first start threshold and to issue a second warning command if motor run time after a motor start command exceeds a second run threshold lower than the first run threshold.

It is an additional feature of the invention to provide a display to visually indicate the warning commands.

It is yet another feature of the invention that the controller is operable to issue a first warning command if number of starts during the select interval exceeds a second start threshold lower than the first start threshold and to issue a second warning command if motor run time after a motor start command exceeds a second run threshold lower than the first run threshold and the warning commands are transmitted on the communication interface to the external device.

There is disclosed in accordance with another aspect of the invention a motor starter system for detecting motor run condition comprising power switches for connection to an AC line for controlling application of AC power to the motor. An input receives a motor start command. A controller is connected to the input for controlling operation of the switches responsive to a motor start command. The controller includes a counter and a timer and is operable to disable the power switches if number of starts during a select interval exceeds a first start threshold.

There is disclosed in accordance with a further aspect of the invention a motor starter system for detecting motor run condition of an elevator motor comprising power switches for connection to an AC line for controlling application of AC power to the elevator motor. An input receives a motor start command. A controller is connected to the input and controls operation of the switches responsive to a motor start command. The controller includes a timer and is operable to disable the power switches if motor run time after a motor start command exceeds a first run threshold.

There is disclosed in accordance with yet another aspect of the invention an elevator motor starter system for detecting elevator motor run condition comprising power switches for connection to an AC line for controlling application of AC power to the elevator motor. An input receives a motor start command from an elevator control. A controller is connected to the input and controls operation of the switches responsive to a motor start command. The controller includes a counter and a timer and is operable to disable the power switches if number of motor starts during a select interval exceeds a first start threshold and to disable the power switches if motor run time after a motor start command exceeds a first run threshold.

There is disclosed in accordance with a further aspect of the invention the method for detecting motor run condition in a motor control system comprising: providing power switches for connection to an AC line for controlling application of AC power to the motor; receiving a motor start command; and controlling operation of the switches responsive to a motor start command, including operating a counter and a timer and disabling the power switches if number of starts during a select interval exceeds a first start threshold and disabling the power switches if motor run time after a motor start command exceeds a first run threshold.

Further features and advantages of the invention will be readily apparent from the specification and from the drawings.

DETAILED DESCRIPTION OF THE INVENTION

Figure 1:
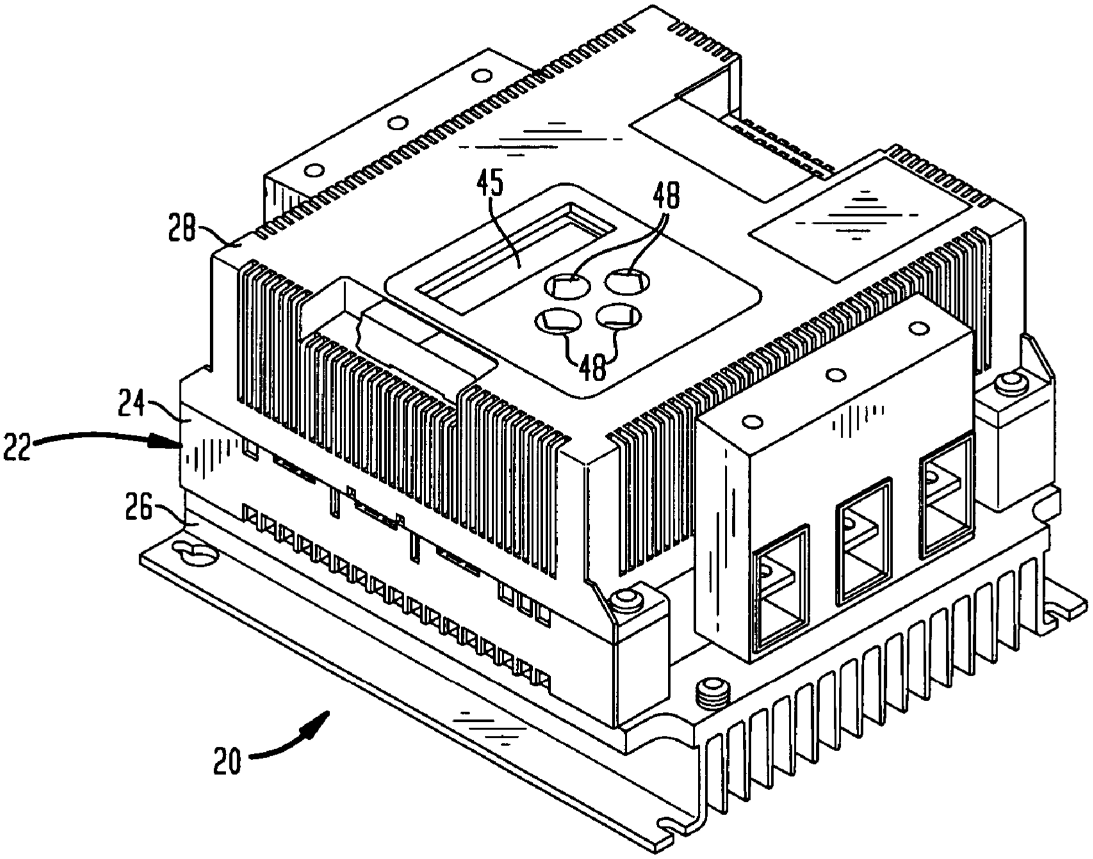
FIG. 1 is a perspective view of a motor controller in accordance with the invention.

Referring initially to FIG. 1, a solid state motor starter/controller 20, referred to hereinafter as simply a starter or a controller, is illustrated. One application for the controller 20 is as an elevator starter. The motor controller 20 may be used to drive a pump for an hydraulic elevator. Each time movement of an elevator car is commanded, the motor controller 20 must start the elevator motor until it reaches operating speed and then operate in a run mode. Such a motor controller 20 may only be used for the up direction as gravity may be used for the down direction.

The motor controller 20 comprises a housing 22 including a housing base 24, a heat sink 26 and a cover 28. The motor controller 20 includes a plurality of solid state power switches 32 in the form of thyristors, such as back to back connected silicon controlled rectifier (SCR) pairs, see FIG. 2. For simplicity herein, the SCR pairs 32 are referred to as simply SCRs. Triacs could also be used. The SCRs 32 control application of three phase AC line voltage to a three phase motor. As is apparent, a different number of SCRs 32 could be used to control different numbers of phases, as is apparent to those skilled in the art.

Figure 2:
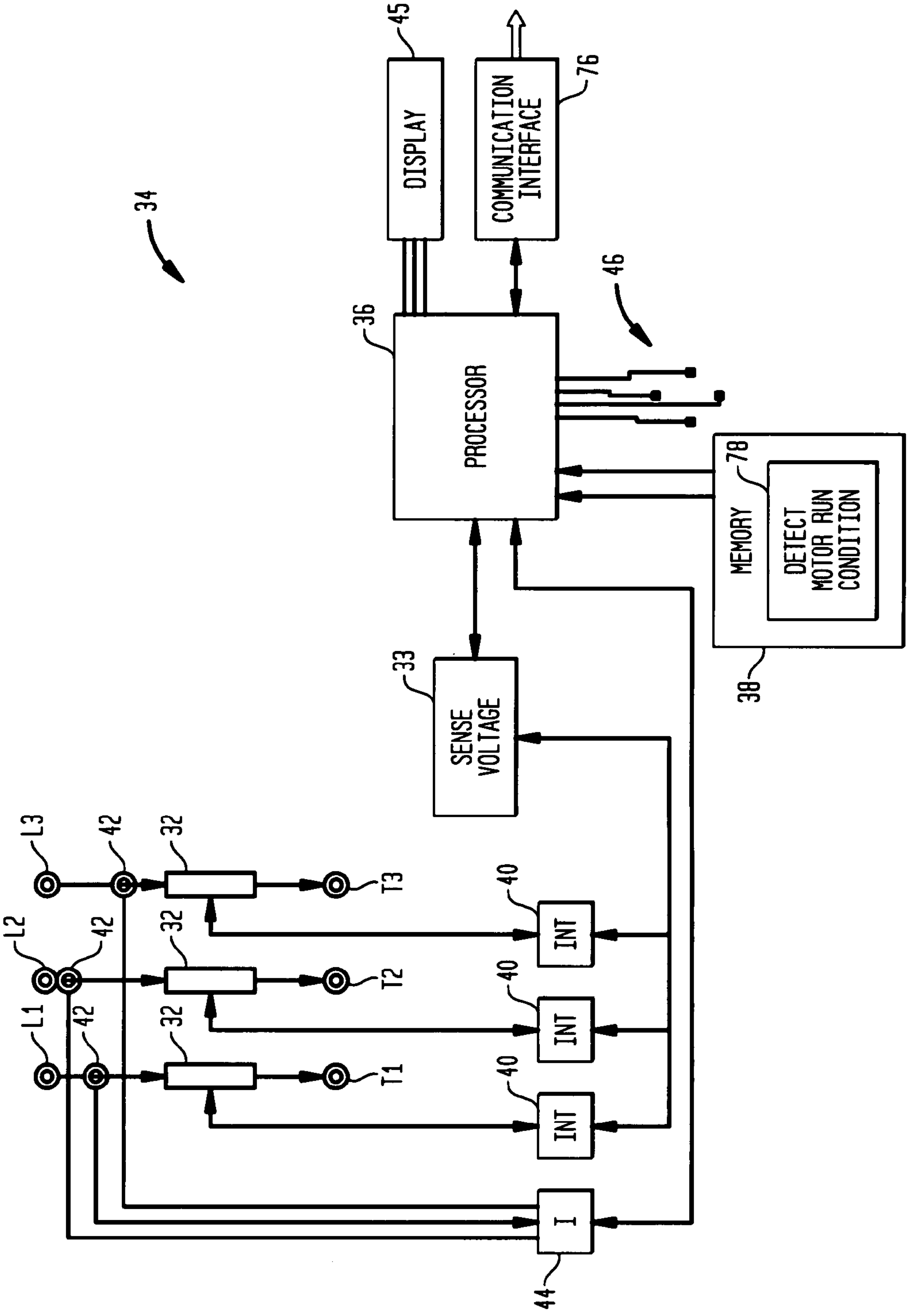
FIG. 2 is a block diagram of the motor controller of FIG. 1.

The SCRs 32 are mounted to the heat sink 26 within the housing 20. Referring also to FIG. 2, a control circuit 34 is also enclosed in the housing 20. The control circuit 34 controls operation of the SCRs 32. Particularly, the control circuit 34 includes a programmed processor 36, such as a digital signal processor, for commanding operation of the SCRs 32. A memory 38 is connected to the processor 36 and stores programs and configuration information relating to operation of the SCRs 32, as described below. As is apparent, the processor 36 may include program memory storing some or all of the programs and configuration information.

The processor 36 is connected via a sense voltage circuit 33 to three interface circuits 40 each for connection to one of the SCRs 32. Particularly, the interface circuits 40 comprise snubber circuits for driving the SCRs 32. The sense voltage circuit 33 senses line voltage and motor terminal voltage. Particularly, the sense voltage circuit 33 measures the line (L2, L2, L3) voltages and the motor terminal (T1, T2, T3) voltages relative to its own internally generated neutral in a conventional manner. A current transformer 42 senses current of each of the SCRs 32 and is connected to a current sense circuit 44. Other types of current sensors could be used. The current sense circuit 44 is also connected to the processor 36.

An LCD display 45 on the cover 28, see FIG. 1, is connected to the processor 36. The display 45 is used to indicate configuration settings, operating values, fault conditions, and the like. User actuable switches 46 are electrically connected to the processor 36. The user actuable switches 46 are actuated by actuator elements 48 on the housing cover 28, see FIG. 1. Particularly, the switches 46 are used for locally selecting parameters for stored configuration information.

Figure 3:
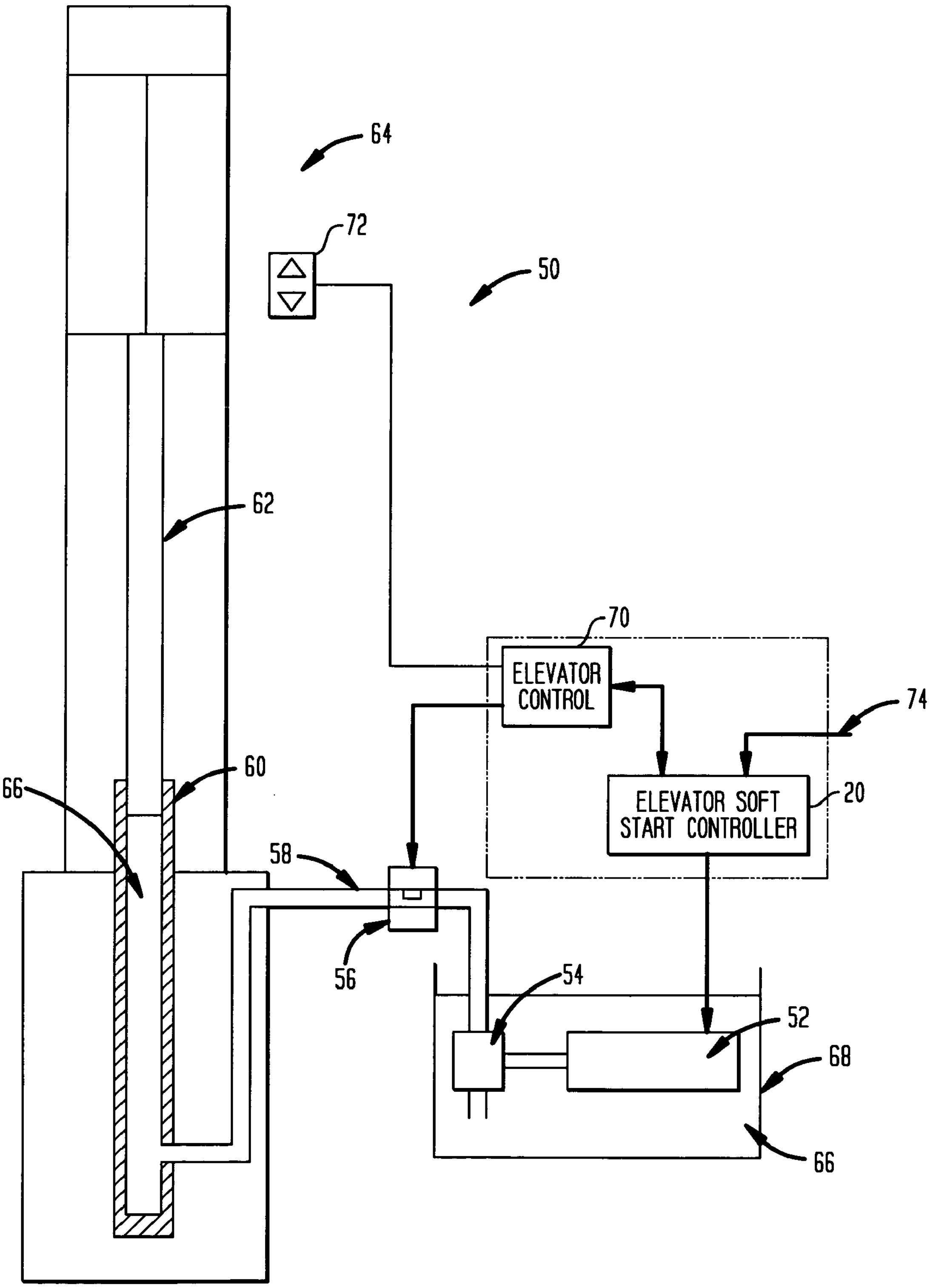
FIG. 3 is a block diagram of a control system for an elevator using the motor controller of FIG. 1.

Referring to FIG. 3, an hydraulic elevator system 50 using the controller 20 is illustrated. The hydraulic elevator system 50 uses an electric motor 52 to run a pump 54. A valve 56 is connected in a pipe 58 between the pump 54 and a cylinder 60. A piston 62, in the cylinder 60, supports an elevator car 64. In the illustrated embodiment of the invention, the motor 52 and the pump 54 are submerged in hydraulic oil 66 in an oil reservoir tank 68.

Overall operation of the hydraulic elevator system 50 is controlled by an elevator control 70. The elevator control 70 receives input commands from hall buttons 72, as well as other typical input devices (not shown). The elevator control 70 controls the valve 56 and is in communication with the controller 20 to command operation of the motor 52 and thus the pump 54. The controller 20 is connected to an AC line 74 for controlling application of AC power to the motor 52. Particularly, the AC line is connected to the line terminals L1, L2 and L3, see FIG. 2. The motor 52 is connected to the motor terminals T1, T2 and T3, see FIG. 2.

When the elevator car 64 has to ascend the motor 52 drives the pump 54, the valve 56 is opened and the hydraulic oil 66 forces the piston 62 and the car 64 upwards. Once the car 64 reaches a selected floor, the valve 56 closes and the motor 52 is turned off by the controller 20. When the elevator car 64 has to descend, the valve 56 opens and gravity causes the car 64 to descend.

The controller 20 is designed for high cycle rates and includes current limit starting to bring the motor 52 up to speed quickly without affecting the incoming power system. It also includes a communications interface 76, see FIG. 2, to interface with the elevator control for receiving motor start and stop commands, as well as other typical commands. The interface 76 may be a wireless interface, or a serial interface or other known or contemplated type of communication interface.

In accordance with the invention, the controller 20 detects if the number of starts over a specified time interval exceeds a preselect limit to shut down the motor 52. Particularly, the controller 20 includes a counter to keep track of the number of starts over the time interval. The value of this counter can be compared to a parameter set by the elevator OEM, or by the installation technician. The time frame can also be a selectable threshold parameter. The parameter can be received over the communication interface 76 or be set using the switches 46.

The controller 20 also provides protection for the motor 52 by including a timer to keep track of the run time. The value of this timer can be compared to a value of an adjustable threshold parameter. If the run time exceeds the threshold setting, the motor 52 would be shut off and the controller 20 displays a fault. The parameter would also be able to be turned off in the event the application is on a traction system.

In some installations, it may be helpful to have an additional warning level to indicate that there is a problem before it gets too serious. This prevents nuisance tripping and unnecessary down time in the elevator. The warning level setting would also be additional threshold parameters. The warnings would show up on the elevator starter LCD display 45. In some cases, the warning levels may want to be remotely monitored. The controller 20 could communicate through the communication interface 76.

The described protection is provided by a detect motor run condition module or program 78 stored in the memory 38 and implemented by the processor 36. Particularly, the timer function and counter function are part of the program 78. The controller 20, under control of the program 78, disables the power switches 32 if number of starts during a select interval exceeds a first start threshold and disables the power switches 32 if motor run time after a motor start command exceeds a first run threshold. The controller 20 is operable to issue a first warning command if number of starts during the select interval exceeds a second start threshold lower than the first start threshold and to issue a second warning command if motor run time after a motor start command exceeds a second run threshold lower than the first run threshold.

Figure 4:
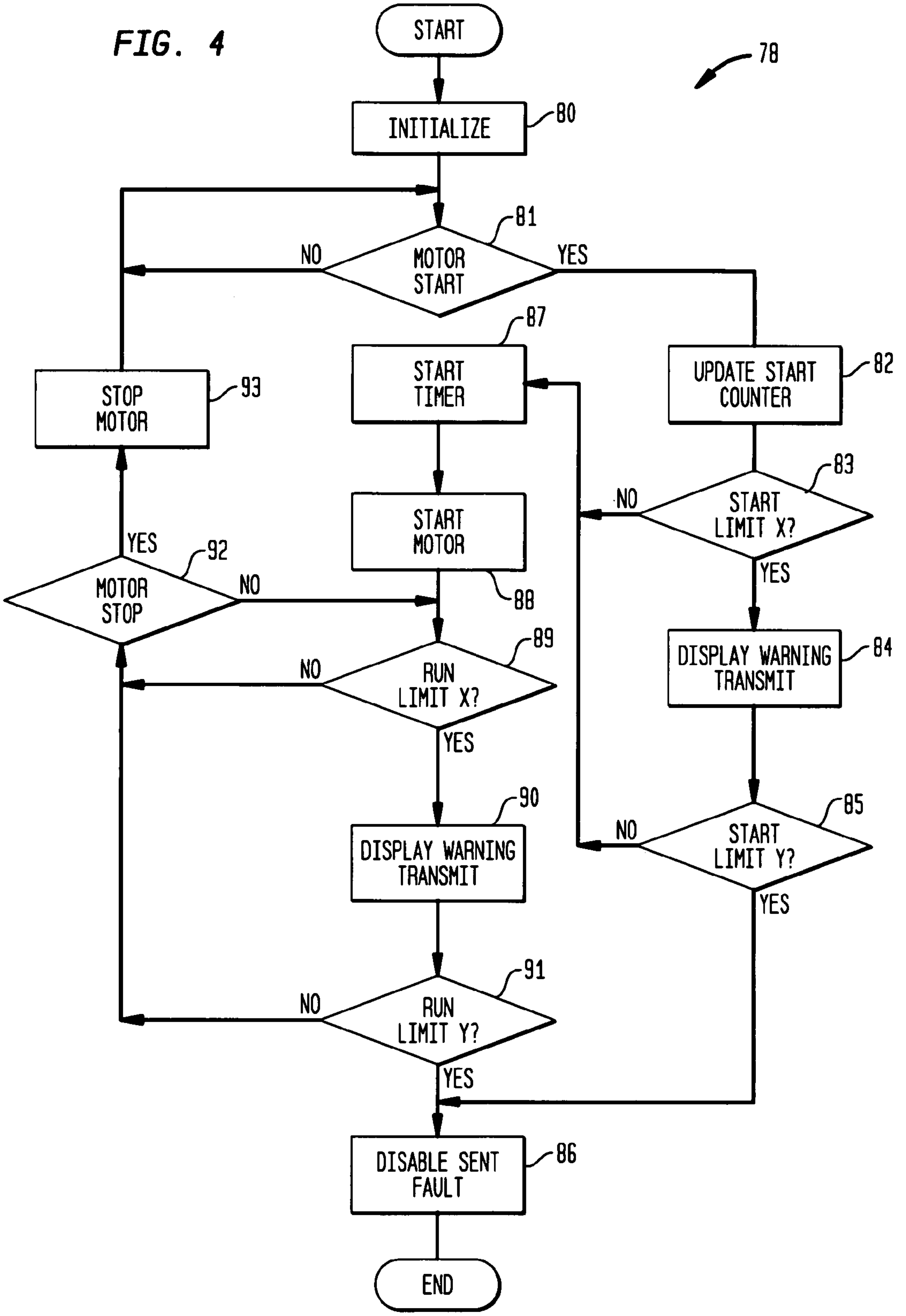
FIG. 4 is a flow diagram illustrating a motor run condition detection module implemented by the processor of FIG. 2.

The detect motor run condition program is illustrated in the flow diagram of FIG. 4. The program begins at an initialize block 80 which resets timers and counters to zero. A decision block 81 determines if a motor start command has been received from the elevator control 70, or elsewhere. If not the program loops back on itself until a start command is received. Once a start command is received a start counter is updated at a block 82. The counter keeps track of the number of starts during a select time interval. This could be done with a log of start times and only counting the number of motor starts during the most recent period represented by the select time interval. For example, the counter could store the number of starts in the most recent one hour period. Other count procedures could be used for tracking starts per time interval, as will be apparent. A decision block 83 determines if the number of starts during the select interval exceeds a warning threshold amount labeled "start limit X". If so then the display 45 displays a warning at a block 84 and a warning signal is transmitted on the communication interface 76. Next a decision block 85 determines if the number of starts during the select interval exceeds an overload threshold amount labeled "start limit Y". If so then the motor is disabled at a block 86 by shutting off the power switches 32 and a fault signal is transmitted on the communication interface 76. As is apparent, the start limit X warning threshold is lower than the start limit Y overload threshold. The routine then ends.

If one of the start limits is not exceeded, as determined at the blocks 83 and 85, then a start timer is started at a block 87. The start timer indicates motor run time. The motor is then started at a block 88 using a conventional soft start routine. A decision block 89 determines if the motor run time exceeds a warning threshold amount labeled "run limit X". If so then the display 45 displays a warning at a block 90 and a warning signal is transmitted on the communication interface 76. Next a decision block 91 determines if the run time exceeds an overload threshold amount labeled "run limit Y". If so then the motor is disabled at the block 86 by shutting off the power switches 32 and a fault signal is transmitted on the communication interface 76. As is apparent, the run limit X warning threshold is lower than the run limit Y overload threshold. The routine then ends. If one of the run limits is not exceeded, as determined at the blocks 89 and 91, then a decision block 92 determines if a motor stop command is received from the elevator control 70, or elsewhere. If not, then the control loops back to the block 89. If so, then the motor is stopped at a block 93. Also, the timer is reset. The program then returns to the decision block 81 to wait for the next start command.

As will be apparent, the processor 36 can and may operate other programs or modules, such as, for example, a soft start module, concurrently with the detect motor run condition program. As such, the flow diagram of FIG. 4 illustrates the basic sequence for the detect motor run condition program independent of any such other programs.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

It can therefore be appreciated that a new and novel system and method for automatically detecting motor run condition in a motor controller has been described. It will be appreciated by those skilled in the art that, given the teaching herein, numerous alternatives and equivalents will be seen to exist which incorporate the disclosed invention. As a result, the invention is not to be limited by the foregoing exemplary embodiments, but only by the following claims.

We claim:

1. A motor control system for detecting motor run condition comprising:

power switches for connection to an AC line for controlling application of AC power to the motor;

an input for receiving a motor start command; and a controller connected to the input and for controlling operation of the switches responsive to a motor start command, the controller including a counter and a timer and being operable to disable the power switches if number of starts during a select interval exceeds a first start threshold and to disable the power switches if motor run time after a motor start command exceeds a first run threshold.

2. The motor control system for detecting motor run condition of claim 1 wherein the controller comprises a programmed processor.

3. The motor control system for detecting motor run condition of claim 1 wherein the input comprises a communication interface for receiving the motor start command from an external device.

4. The motor control system for detecting motor run condition of claim 3 wherein the controller transmits a signal on the communication interface if the power switches are disabled.

5. The motor control system for detecting motor run condition of claim 4 wherein the controller is operable to issue a first warning command if number of starts during the select interval exceeds a second start threshold lower than the first start threshold and to issue a second warning command if motor run time after a motor start command exceeds a second run threshold lower than the first run threshold and the warning commands are transmitted on the communication interface to the external device.

6. The motor control system for detecting motor run condition of claim 1 wherein the controller is operable to issue a first warning command if number of starts during the select interval exceeds a second start threshold lower than the first start threshold and to issue a second warning command if motor run time after a motor start command exceeds a second run threshold lower than the first run threshold.

7. The motor control system for detecting motor run condition of claim 6 further comprising a display to display an indication of the warning commands.

8. A motor starter system for detecting motor run condition comprising:

power switches for connection to an AC line for controlling application of AC power to the motor;

an input for receiving a motor start command; and a controller connected to the input and for controlling operation of the switches responsive to a motor start command, the controller including a counter and a timer and being operable to disable the power switches if number of starts during a select interval exceeds a first start threshold, wherein the controller is operable to issue a warning command if number of starts during the select interval exceeds a second start threshold lower than the first start threshold.

9. The motor starter system for detecting motor run condition of claim 8 wherein the controller comprises a programmed processor.

10. The motor starter system for detecting motor run condition of claim 8 wherein the input comprises a communication interface for receiving the motor start command from an external device.

11. The motor starter system for detecting motor run condition of claim 10 wherein the controller transmits a signal on the communication interface to the external device if the power switches are disabled or responsive to the warning command.

12. A motor starter system for detecting motor run condition of an elevator motor comprising:

power switches for connection to an AC line for controlling application of AC power to the elevator motor;

an input for receiving a motor start command; and a controller connected to the input and for controlling operation of the switches responsive to a motor start command, the controller including a timer and being operable to disable the power switches if motor run time after a motor start command exceeds a first run threshold.

13. The motor starter system for detecting motor run condition of an elevator motor of claim 12 wherein the controller comprises a programmed processor.

14. The motor starter system for detecting motor run condition of an elevator motor of claim 12 wherein the controller is operable to issue a warning command if motor run time after a motor start command exceeds a second run threshold lower than the first run threshold wherein the input comprises a communication interface for receiving the motor start command from an external device.

15. The motor starter system for detecting motor run condition of an elevator motor of claim 12 wherein the input comprises a communication interface for receiving the motor start command from an external device.

16. The motor starter system for detecting motor run condition of an elevator motor of claim 15 wherein the controller is operable to issue a warning command if motor run time after a motor start command exceeds a second run threshold lower than the first run threshold and the controller transmits a signal on the communication interface to the external device if the power switches are disabled or responsive to the warning command.

17. An elevator motor starter system for detecting elevator motor run condition comprising:

power switches for connection to an AC line for controlling application of AC power to the elevator motor;

an input for receiving a motor start command from an elevator control; and a controller connected to the input and for controlling operation of the switches responsive to a motor start command, the controller including a counter and a timer and being operable to disable the power switches if number of motor starts during a select interval exceeds a first start threshold and to disable the power switches if motor run time after a motor start command exceeds a first run threshold.

18. The elevator motor starter system for detecting elevator motor run condition of claim 17 wherein the controller comprises a programmed processor.

19. The elevator motor starter system for detecting elevator motor run condition of claim 17 wherein the input comprises a communication interface for receiving the motor start command from the elevator control.

20. The method for detecting motor run condition in a motor control system comprising:

providing power switches for connection to an AC line for controlling application of AC power to the motor;

receiving a motor start command; and controlling operation of the switches responsive to a motor start command, including operating a counter and a timer and disabling the power switches if number of starts during a select interval exceeds a first start threshold and disabling the power switches if motor run time after a motor start command exceeds a first run threshold.

21. The method of claim 20 further comprising providing a programmed processor for controlling the switches.

22. The method of claim 20 wherein receiving the motor start command comprises providing a communication interface for receiving the motor start command from an external device.

23. The method of claim 22 further comprising transmitting a signal on the communication interface if the power switches are disabled.

24. The method of claim 23 further comprising issuing a first warning command if number of starts during the select interval exceeds a second start threshold lower than the first start threshold and issuing a second warning command if motor run time after a motor start command exceeds a second run threshold lower than the first run threshold and transmitting the warning commands on the communication interface to the external device.

25. The method of claim 20 further comprising to issuing a first warning command if number of starts during the select interval exceeds a second start threshold lower than the first start threshold and issuing a second warning command if motor run time after a motor start command exceeds a second run threshold lower than the first run threshold.

26. The method of claim 25 further comprising providing a display to display an indication of the warning commands.

* * * * *